UNITED STATES PATENT OFFICE.

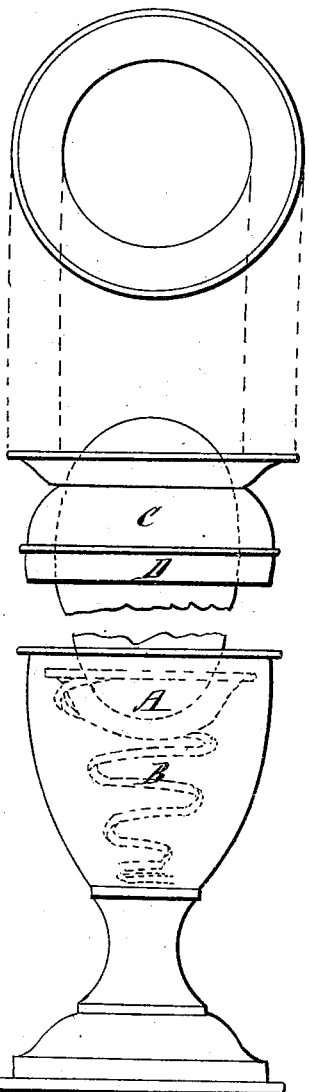

FRANZ WEGRATHER, OF CHICAGO, ILLINOIS.

IMPROVED EGG-HOLDER.

Specification forming part of Letters Patent No. 53,712, dated April 3, 1866.

*To all whom it may concern:*

Be it known that I, FRANZ WEGRATHER, of Chicago, in the county of Cook, in the State of Illinois, have invented a new and useful vessel or cup that has to be used for boiled eggs to be served and eaten at the table; and I do hereby declare that the following is a full, clear, and exact description of the construction and the use of the same, reference being had to the annexed drawings, making a part of this specification.

My egg-holder is a cup on a standard, the cup having the shape of a truncated egg. It is divided in two parts—the lower part or cup proper and the upper part or ring. The lower part contains a little cup, A, with a metallic spring or coil, B, attached under it, the cup A serving as a support to an egg, and the spring to hold an egg firmly in the egg-holder when the ring C is in its place, and to throw out the shell after the egg is emptied and the ring C taken off. The upper part or ring, C, has a flange, D, that may be smooth or grooved, that enters the lower part of the egg-holder, which part may be smooth or may have a projection or frieze to enter the groove of the upper ring, the egg protruding through the ring.

When the egg is put on the cup A and both parts of the egg-holder are put together the egg sets firmly in the cup. After the shell of the protruding part of the egg is broken and the contents of the egg emptied, the ring C is taken off and the empty shell is forced out by the spring B. The vessel may be made of metal or wood or some other material.

I claim—

The cup formed in sections, as shown, and provided with the cup A and spring B, all arranged to operate as and for the purpose set forth.

FRANZ WEGRATHER.

Witnesses:
BRUNO KRAUER,
JOHN B. TURCHIN.